United States Patent
Petrich

(10) Patent No.: US 6,258,280 B1
(45) Date of Patent: Jul. 10, 2001

(54) PROCESS FOR REDUCING THE ALGAE GROWTH IN WATER

(75) Inventor: Peter Petrich, Vienna (AT)

(73) Assignee: Biotop Landschaftsgestaltung Gesellschaft m.b.H. (AT)

( * ) Notice: Subject to any disclaimer, the term of this patent is extended or adjusted under 35 U.S.C. 154(b) by 0 days.

(21) Appl. No.: 09/349,880

(22) Filed: Jul. 8, 1999

(51) Int. Cl.$^7$ ........................................ C02F 7/00
(52) U.S. Cl. ............................ 210/747; 210/764
(58) Field of Search ................. 210/696, 698, 210/747, 749, 764, 170, 169, 603, 901; 71/9

(56) References Cited

U.S. PATENT DOCUMENTS

| | | | |
|---|---|---|---|
| 3,125,486 | * | 3/1964 | Schmitz et al. |
| 4,323,367 | * | 4/1982 | Ghosh ........................ 210/603 |
| 4,518,399 | * | 5/1985 | Croskell et al. ............. 210/603 |
| 4,551,243 | * | 11/1985 | Martin ......................... 210/539 |
| 4,670,148 | * | 6/1987 | Schneider ................... 210/603 |
| 4,906,359 | * | 3/1990 | Cox, Jr. ....................... 210/170 |
| 5,181,950 | * | 1/1993 | Kneer ........................... 71/9 |
| 5,833,841 | * | 11/1998 | Koslowsky ................. 210/96.1 |
| 5,851,398 | * | 12/1998 | Adey ............................ 210/602 |
| 5,928,521 | * | 7/1999 | Levec .......................... 210/758 |

FOREIGN PATENT DOCUMENTS

| | | |
|---|---|---|
| 562556 | 6/1975 | (CH) . |
| 149206 | 7/1981 | (DE) . |
| 262846 | 12/1988 | (DE) . |
| 10-235377 | * 9/1998 | (JP) . |
| 9321115 | 10/1993 | (WO) . |
| WO 93/21115 | * 10/1993 | (WO) . |

* cited by examiner

*Primary Examiner*—David A. Simmons
*Assistant Examiner*—Frank M. Lawrence
(74) *Attorney, Agent, or Firm*—Ostrolenk, Faber, Gerb & Soffen, LLP

(57) ABSTRACT

The invention relates to a simple and environmentally friendly method to reduce the growth of algae in natural or artificially created bodies of water such as lakes, pools, ponds or swimming pools by the introduction of $CO_2$. According to the invention the $CO_2$ is obtained from air from the soil or from air from stacks of compost, with said air being mixed with the water to be treated.

13 Claims, 1 Drawing Sheet

PROCESS FOR REDUCING THE ALGAE GROWTH IN WATER

This application is based on European Application No. 98124781.0 filed 29 Dec. 1998, and Austrian Application No. 16/98-3 filed 9 Jan. 1998, the disclosures of which are incorporated by reference herein.

The present invention relates to a method for reducing the growth of algae in natural or articifially created bodies of water such as lakes, pools, ponds or swimming pools by the introduction of $CO_2$. The invention relates further to an apparatus to perform the method.

BACKGROUND OF THE INVENTION

Increased growth of algae occurs frequently in natural and artificially created bodies of water. The reason is mostly the increased concentration of plant nutrients, in particular nitrogen and phosphorus. That is why considerable efforts are currently made to keep these nutrients away from waters.

Despite the low concentration of said nutrients one can still observe a strong development of algae in many waters. For example, the optimal phosphorus concentration for the growth of the alga *Asterionella formosa* is 2 μg/l. This value is so low that it can hardly be achieved in bodies of water.

The growth of aquatic plants which could obstruct the growth of algae is usually very low in algae-rich waters. Moreover, a high pH-value can nearly always be observed in the water. Algae encounter particularly favourable living conditions at a high pH-value, whereas aquatic plants which live in nutritive competition with the algae prefer lower pH-values. In order to improve the living conditions for the aquatic plants and, at the same time, to deteriorate those for algae, efforts are also made to lower the pH-value in the water. This is usually performed by adding mineral acids such as hydrochloric acid or sulphuric acid. The addition of these acids, however, is problematic, since they represent, on the one hand, a serious burden to the environment and their application, on the other hand, requires considerable amounts of material and is costly.

It has already been proposed in WO 93/21115 to improve the water quality of stagnant or slow-flowing waters by introducing $CO_2$ in order to set the pH-value of a body of water to such a range that the growth of algae is prevented. It is generally proposed to introduce technically produced $CO_2$ gas into the body of water by means of suitable apparatuses such as atomizers or nozzles and in suitable form such as mixed with air or in an aqueous solution. This publication, however, does not disclose a method that would allow providing the required quantities of $CO_2$ with an acceptable or even low effort.

SUMMARY OF THE INVENTION

The invention is therefore based on the object of providing a simple and environmentally friendly method for reducing the growth of algae in bodies of water by using $CO_2$.

This object is achieved in accordance with the invention that the $CO_2$ is obtained from the air, the soil or from compost stacks, with said air being mixed with the water to be treated.

DETAILED DESCRIPTION OF THE INVENTION

Figure 1:
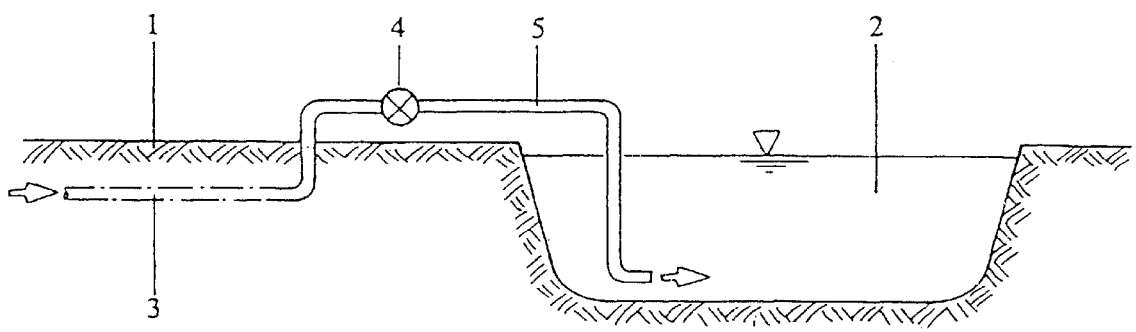
FIG. 1 shows an apparatus in accordance with the invention for the reduction of the growth of algae in a body of water (2) laid on soil (1) and comprising a perforated drainage tube (3), an air pump (4) and conduit tube (5).

The method as proposed in accordance with the present invention therefore utilizes resources that are present on-site and is thus simple and, at the same time, extremely friendly to the environment. In order to decrease the pH-value in the water to reduce the growth of algae the solution in accordance with the invention utilizes the fact that depending on the location the $CO_2$ partial pressure of the soil air is up to two hundred times higher than the $CO_2$ partial pressure of the atmosphere of 0.03%. The $CO_2$ partial pressure of the soil air is so high because $CO_2$ is produced during the root respiration and the respiration of the soil organisms and the exchange of gas with the atmosphere is delayed. In this way approx 8000 kg of $CO_2$ are released on the average in wood and agricultural land per hectare and year. A further important advantage of this solution in accordance with the invention is that the $CO_2$ partial pressure of the soil air is precisely so high that the optimal pH-value will set in the water, so that dosing devices can mostly be omitted and overdosing can be excluded. Moreover, the production of $CO_2$ in the soil is highest when also the $CO_2$ consumption in the water is highest, namely in summer. Simultaneously, the aquatic plants are fertilised with $CO_2$ by the application and thus the water-cleansing effect is promoted. The amount of required technology is in total very low as a result of utilising natural production of $CO_2$. The amount of required technology is similarly low in the second variant of the invention where the circumstance is utilised that in stacks of compost the concentration of $CO_2$ is particularly high as a result of the respiratory activities of the soil organisms which mineralise the organic compounds of the biological waste.

The method in accordance with the invention can be performed particularly easily in practical application in that air is sucked from the soil or from stacks of compost with the help of a collecting system, e.g. by means of drainage pipes or other apparatuses, and thereafter is mixed with the water to be treated, with the air being injected into said water in particular, as a result of which the $CO_2$ dissolves in the water and the pH-value is reduced.

The performance of the method in accordance with the invention is very simple, as the air can be conveyed with a suitable pump, e.g. a motor-driven air pump or a water jet air pump. The introduction of the air into the body of water can preferably also be performed by solar-driven pumps by way of direct drive, as the demand for $CO_2$ is only given during daylight.

In a particularly preferable variant of the method in accordance with the invention the air is introduced directly into the body of water. In this way the technological requirements can be kept particularly low.

Another variant of the method in accordance with the invention provides that the air is mixed outside of the body of water with the water to be treated. Depending on the respective layout of the body of water or even in the case of swimming ponds or pools it can be beneficial or desirable not to house any conduits, pumps or the like in the body of water itself.

In order to increase the degree of solution of the $CO_2$ in the body of water it is possible to either employ the principle of reverse current, which means that supplied high-$CO_2$ air and low-$CO_2$ water flow in opposite directions and intermingle, or turbulences or eddy flows can be produced in the water.

In the case of a further measure for improving the degree of solution which can be performed very easily it is provided to slow down the rise of the supplied high-$CO_2$ air, which is performed by installing obstructions arranged like stairs or by providing porous bodies such as gravel heapings, sponges and the like.

The apparatus for performing the method in accordance with the invention comprises an air collecting system which can be laid in the soil, in the stacks of compost or the like and comprises in particular perforated drainage tubes or pipes, and at least one pump as well as tubes or pipes for introducing or distributing the high-$CO_2$ air in the body of water. The apparatus in accordance with the invention is therefore arranged very simply, can be laid very easily and only requires a low amount of technology.

In a preferred embodiment of the apparatus it is further provided that it comprises conduit aerators which can be laid in the body of water, in particular in the form of perforated pipes or tubes, and/or porous emission bodies such as porous rock or the like. This allows for a favourable distribution of the high-$CO_2$ air supplied to the body of water.

The invention is now explained in closer detail by reference to the enclosed drawing which shows two embodiments. The two figures of the drawing, namely FIGS. 1 and 2, are schematic representations and illustrate the function of the present invention on the basis of sections through a body of water and its immediate surroundings.

In both embodiments an air collecting system such as drainage tubes 3 or drainage pipes, which are perforated tubes or pipes, are laid in the soil 1 outside of the treated body of water 2.

In the embodiment as illustrated in FIG. 1 soil air is sucked in from said soil-air collecting system with the help of an air pump 4, conveyed through conduits 5 which can also be tubes or pipes and blown into the body of water 2.

Figure 2:
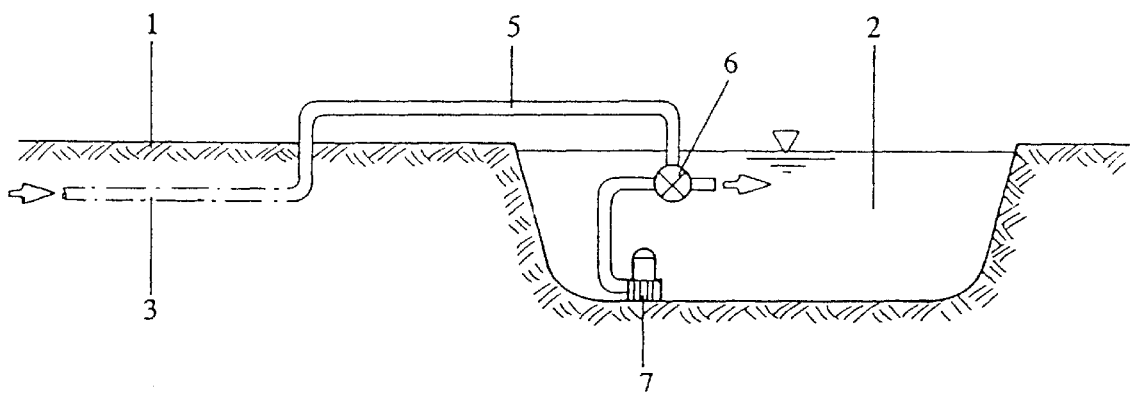
FIG. 2 shows an apparatus with accordance with the invention for the reduction of the growth of algae in a body of water (2) laid on soil (1) and comprising a perforated drainage tube (3), a conduit tube (5) and a water jet air pump (6) which produces a vacuum with the help of water pressure of a water pump (7).

FIG. 2 shows an embodiment where the air suction occurs through a water jet air pump 6 which produces a vacuum with the help of the water pressure of a water pump 7 or the water mains.

In the two illustrated embodiments the soil air is directly mixed into the body of water to be treated. The mixing of the soil air with the water can occur in a mixing vessel outside of the water.

In a further embodiment of the invention the air can similarly be sucked in from stacks of compost and be mixed with the water to be treated. The $CO_2$ concentration is particularly high in stacks of compost owing to the respiratory activities of the soil organisms which mineralise the organic compounds of the biological waste.

In order to achieve an even distribution of the high-$CO_2$ soil air in the water body the high-$CO_2$ air is blown into the water from the soil or from the stacks of compost preferably through conduit aerators, which are perforated pipes or tubes laid in the body of water. In order to support a favourable solution of the $CO_2$ in the water it is further advantageous to use emission rocks, which are porous bodies through which the air is pressed in order to produce very small bubbles.

A particularly high degree of solution is achieved by applying the principle of reverse current by means of at least one pump for example which pumps high-$CO_2$ air in a perpendicularly mounted pipe in the water body upwards from below and, simultaneously, low-$CO_2$ water downwardly from above and the two flows intermingle.

An improvement in the degree of solution can also be achieved by the installation of devices in the body of water which hinder the rise of high-$CO_2$ air bubbles, thus extending the dwell time of the $CO_2$ in the body of water. For this purpose it is possible to provide installations in the form of plates arranged in steps or the like, over which the high-$CO_2$ air supplied to the body of water will flow upwardly. A similar effect can be achieved by allowing porous bodies such as gravel heapings, sponges or the like which are housed in the water to be flowed through. If materials are used which can absorb nutrients such as phosphorus or nitrogen an additional cleansing effect can be achieved, because a water flow is produced by the rising air and the nutrients can be withdrawn from the water when the water flows through the porous bodies.

In another possible alternative the degree of solution can be increased by producing turbulences by means of agitators or by eddy flows. This can occur within the body of water or outside in a separate vessel.

What is claimed is:

1. A method for reducing the growth of algae in natural or artificially created bodies of water comprising:

(a) gathering air containing $CO_2$ from soil or compost stacks; and (b) mixing said air with the body of water to be treated.

2. A method as claimed in claim 1, characterized in that the air from the soil or from stacks of compost is sucked in by means of a collecting system.

3. A method as claimed in claim 1, characterized in that the air is conveyed by means of a pump.

4. A method as claimed in claim 1, characterized in that the air is conveyed by means of a solar-operated pump.

5. A method as claimed in claim 1, characterized in that the air is introduced directly into the body of water.

6. A method as claimed in claim 1, characterized in that the air is mixed outside of the body of water with the water to be treated.

7. A method as claimed in claim 1, characterized in that high-$CO_2$ air and low-$CO_2$ water flow in opposite directions according to the principle of reverse flow and are intermingled.

8. A method as claimed in claim 1, characterized in that the ascent of the supplied high-$CO_2$ air is slowed down in the body of water.

9. A method as claimed in claim 3, wherein said pump is an air pump.

10. A method as claimed in claim 3, wherein said pump is a water jet air pump.

11. A method as claimed in claim 2, wherein said air collecting system comprises drainage pipes.

12. A method as claimed in claim 1, wherein turbulances or eddy flows are produced in the water.

13. A method as claimed in claim 8, wherein said ascent is slowed by installing obstructions in the body of water.

* * * * *